US012759476B2

(12) United States Patent
Kuramata

(10) Patent No.: US 12,759,476 B2
(45) Date of Patent: Oct. 13, 2026

(54) CARGO ROOM TRIM AND TRIM MANUFACTURING METHOD

(71) Applicant: KASAI KOGYO CO., LTD., Kanagawa (JP)

(72) Inventor: Hikaru Kuramata, Takasaki (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 210 days.

(21) Appl. No.: 18/844,040

(22) PCT Filed: Mar. 14, 2022

(86) PCT No.: PCT/JP2022/011282
§ 371 (c)(1),
(2) Date: Sep. 4, 2024

(87) PCT Pub. No.: WO2023/175665
PCT Pub. Date: Sep. 21, 2023

(65) Prior Publication Data

US 2025/0206239 A1 Jun. 26, 2025

(51) Int. Cl.
*B60R 13/01* (2006.01)
*B32B 5/02* (2006.01)
(Continued)

(52) U.S. Cl.
CPC .............. *B60R 13/011* (2013.01); *B32B 5/02* (2013.01); *B32B 27/20* (2013.01); *B32B 27/32* (2013.01);
(Continued)

(58) Field of Classification Search
CPC ... B60R 13/011; B60R 13/02; B60R 13/0237; B60R 13/0815; B60R 2013/016; B32B 27/08; B32B 27/32
(Continued)

(56) References Cited

U.S. PATENT DOCUMENTS 9,346,375 B2 * 5/2016 Preisler .................... B60N 2/91
9,457,737 B1 * 10/2016 Greggs ..................... B60R 5/04
(Continued)

FOREIGN PATENT DOCUMENTS

CN 109017609 B * 2/2023 ............. B29C 45/40
EP 2075141 A2 7/2009
(Continued)

OTHER PUBLICATIONS

International Search Report for International Application No. PCT/JP2022/011282 dated May 17, 2022, Japan, 2 pages.

*Primary Examiner* — Jason S Daniels
(74) *Attorney, Agent, or Firm* — United IP Counselors, LLC

(57) ABSTRACT

A cargo room trim is included in a side wall of a cargo room disposed horizontally next to and/or above a rear wheel of a vehicle. The cargo room trim includes: a first plate section that includes a resin having an elongation rate which is equal to or greater than 120%, and has: an outward recess recessed from an inner side of the cargo room to an outer side of the cargo room; and an inward recess that is continuous with the outward recess in a front-back direction of the cargo room, and is recessed from the outer side of the cargo room to the inner side of the cargo room; a second plate section disposed along the first plate section; and a sound absorbing material disposed between the first plate section and the second plate section.

12 Claims, 4 Drawing Sheets

(51) Int. Cl.
*B32B 27/20* (2006.01)
*B32B 27/32* (2006.01)
*B60R 13/08* (2006.01)

(52) U.S. Cl.
CPC .... *B60R 13/0815* (2013.01); *B32B 2307/102* (2013.01); *B32B 2605/003* (2013.01); *B60R 2013/016* (2013.01)

(58) Field of Classification Search
USPC .................................... 296/1.08, 37.8, 37.13
See application file for complete search history.

(56) References Cited

U.S. PATENT DOCUMENTS

| | | | | |
|---|---|---|---|---|
| 2009/0165946 | A1 | 7/2009 | Suzuki et al. | |
| 2009/0321182 | A1* | 12/2009 | Boyce | B60R 13/0815 181/284 |
| 2011/0068596 | A1* | 3/2011 | Someschan | B60R 13/02 296/146.7 |

FOREIGN PATENT DOCUMENTS

| | | | | |
|---|---|---|---|---|
| JP | 2006-213151 | A | 8/2006 | |
| JP | 2008-162549 | A | 7/2008 | |
| JP | 2009-173011 | A | 8/2009 | |
| JP | 2013-035497 | A | 2/2013 | |
| JP | 2014-043157 | A | 3/2014 | |
| JP | 2018-202991 | A | 12/2018 | |
| WO | WO-2014046114 | A1 * | 3/2014 | B60R 13/011 |

* cited by examiner

CARGO ROOM TRIM AND TRIM MANUFACTURING METHOD

CROSS-REFERENCE TO RELATED APPLICATIONS

This application is a National Stage Entry application of PCT International Application No. PCT/JP2022/011282, filed on Mar. 14, 2022, the entire contents of which are hereby incorporated by reference.

BACKGROUND

1. Technical Field

The present disclosure relates to a cargo room trim and a trim manufacturing method.

2. Description of the Background

JP-2018-202991-A (hereinafter referred to as Patent Literature 1) discloses a cargo room trim having an apron (written as a "trunk side trim" in Patent Literature 1) disposed on the vehicle front side, a lid section disposed on the vehicle rear side, and a sound absorbing member disposed on the outer side of the apron.

BRIEF SUMMARY

For example, for the front portion of a cargo room trim like the apron mentioned before, a fiber reinforced sheet containing a glass fiber for a sound absorption effect is used as a wall material to face a cargo room. The fiber reinforced sheet mainly absorbs high-frequency tire pattern noise since the fiber reinforced sheet has sound absorption properties.

The rear portion of the cargo room trim like the lid section mentioned before is a portion that is desired to be formed by deep drawing in order to increase the volume of the cargo room. However, since the elongation rate of a fiber reinforced sheet is not high, a resin having a high elongation rate or an INJ molded resin (injection molded resin) needs to be used separately.

In this case, although the front portion of the cargo room trim can be molded with a member having a low elongation rate, the rear portion of the cargo room trim needs to be molded with a member having a high elongation rate, and the front portion and the rear portion are molded as separate bodies.

The present invention has been made in view of the circumstance, and an object thereof is to provide a cargo room trim and a trim manufacturing method that make it possible to mold, as a solid plate, the front portion and rear portion of a plate material included in the cargo room trim while ensuring high-frequency-noise sound absorption performance.

In order to solve the problems, a cargo room trim of the present invention is a cargo room trim included in a side wall of a cargo room disposed horizontally next to and/or above a rear wheel of a vehicle, the cargo room trim including: a first plate section that includes a resin having an elongation rate which is equal to or greater than 120%, and has: an outward recess recessed from an inner side of the cargo room to an outer side of the cargo room; and an inward recess that is continuous with the outward recess in a front-back direction of the cargo room, and is recessed from the outer side of the cargo room to the inner side of the cargo room; a second plate section disposed along the first plate section; and a sound absorbing material disposed between the first plate section and the second plate section.

According to the cargo room trim, the double wall structure including the first plate section and the second plate section, and the sound absorbing material between the first plate section and the second plate section absorb high-frequency tire pattern noise. In addition, since the first plate section is formed of a resin having an elongation rate which is equal to or greater than 120%, the member of the rear portion of the first plate section can be manufactured using the material of the member of the front portion of the first plate section included in the cargo room trim without occurrence of a fracture even if drawing or the like is performed. As a result, it is possible to mold, as a solid plate, the front portion and rear portion of the plate material included in the cargo room trim 1 while ensuring high-frequency-noise sound absorption performance.

According to the present invention, it is possible to mold, as a solid plate, the front portion and rear portion of the cargo room trim while ensuring high-frequency-noise sound absorption performance.

DETAILED DESCRIPTION

Hereinbelow, the present invention is explained along a suitable embodiment. Note that the present invention is not limited to the embodiment depicted below, but can be modified as appropriate within the scope not departing from the aim of the present invention. In addition, although there are portions in the embodiment depicted below where illustrations or explanations of some configurations are omitted, it is needless to say that known or well-known technologies are applied as appropriate to details of the omitted technologies within such a scope that contradictions with content explained below are not generated.

Figure 1:
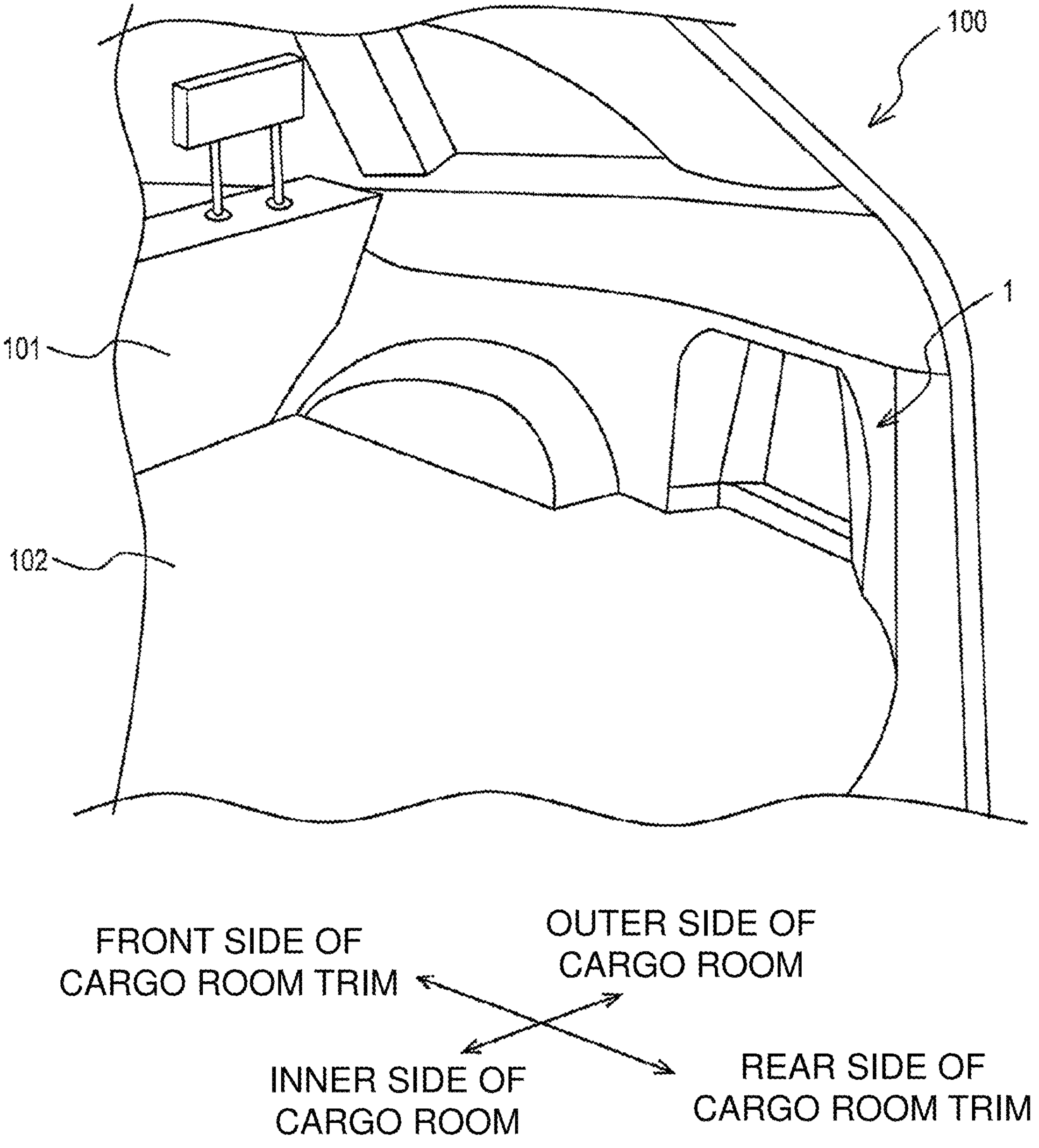
FIG. 1 is a perspective view of the inside of a vehicle to which a cargo room trim according to the present embodiment is applied, as seen obliquely from behind.

FIG. 1 is a perspective view of the inside of a vehicle 100 to which a cargo room trim 1 according to the present embodiment is applied, as seen obliquely from behind. The cargo room trim 1 is included in the side wall of a cargo room 102 behind a rear seat 101 of the vehicle 100. FIG. 1 depicts a state of the cargo room trim 1 as seen from the inner side of the cargo room 102.

Figure 2:
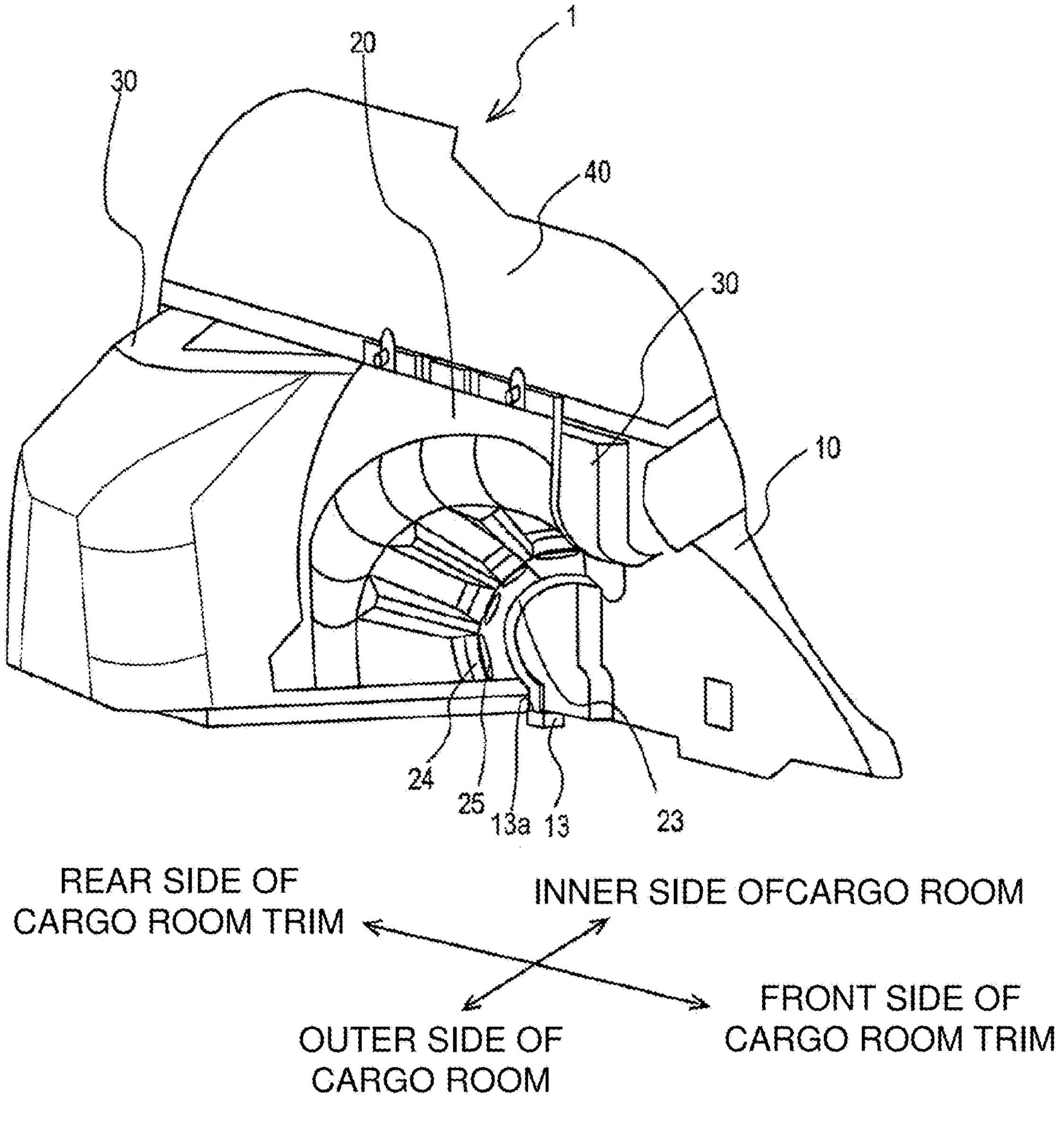
FIG. 2 is a perspective view of the cargo room trim as seen from the outer side.
Figure 3:
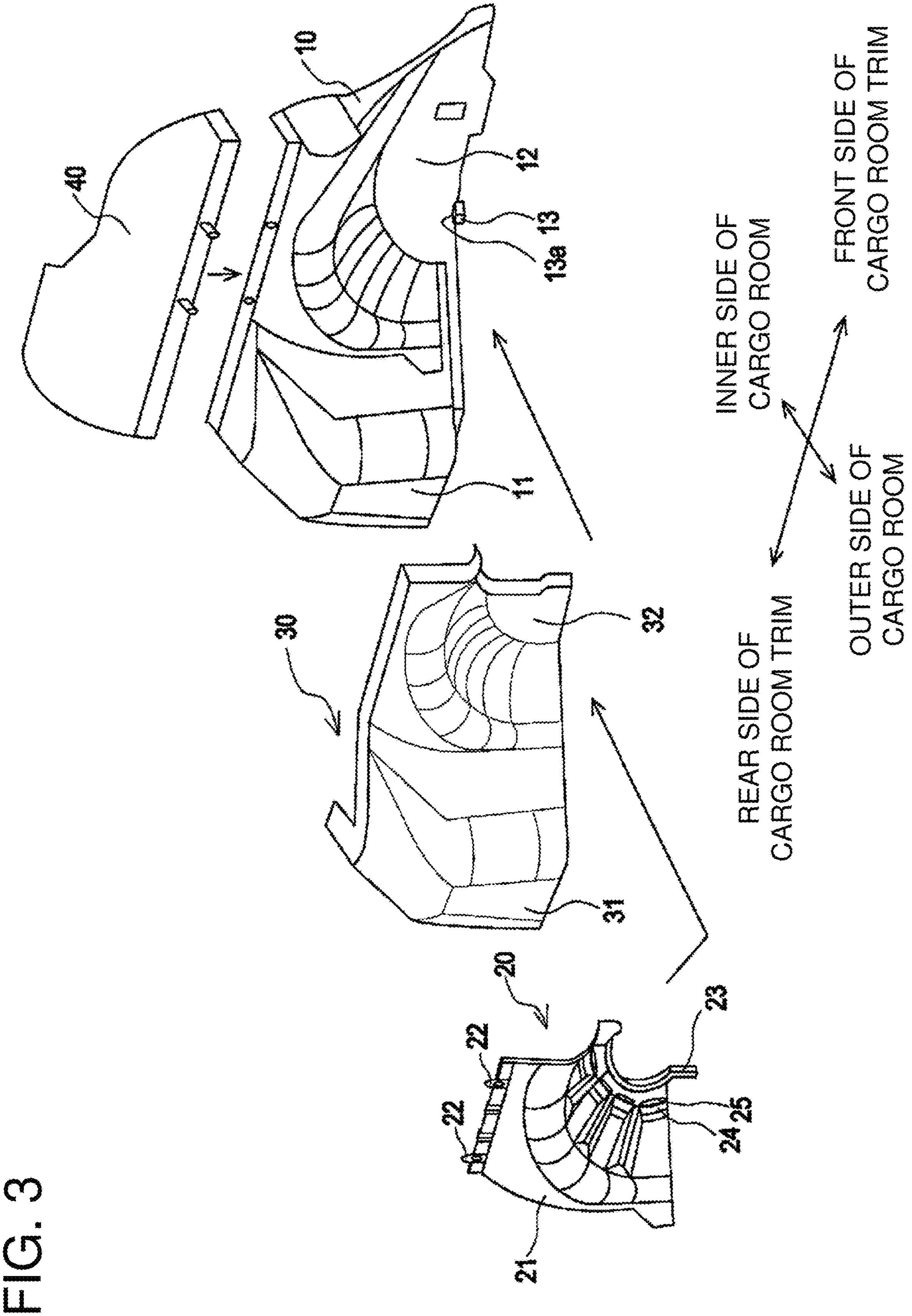
FIG. 3 is an exploded perspective view of the cargo room trim.
Figure 4A:
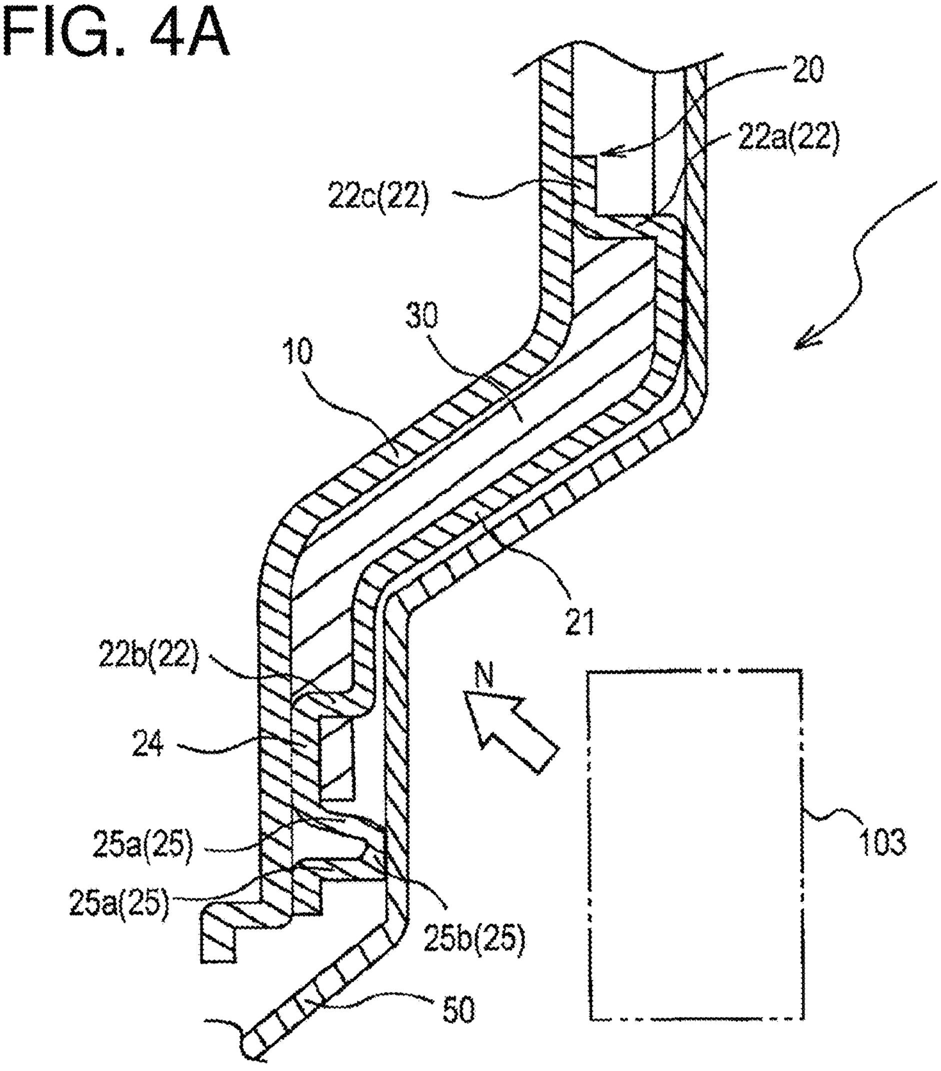
FIG. 4A is a conceptual diagram representing the configuration of the cargo room trim.

FIG. 2 is a perspective view of the cargo room trim 1 as seen from the outer side. FIG. 3 is an exploded perspective view of the cargo room trim 1. FIG. 4A is a conceptual diagram depicting the configuration of the cargo room trim 1. FIG. 2 and FIG. 3 depict the cargo room trim 1 as seen from an angle from the outer side of the cargo room 102. The cargo room trim 1 is disposed horizontally next to and/or above a rear wheel 103 of (see FIG. 4A) of the vehicle, and is included in the side wall of the cargo room 102 (see FIG. 1). The cargo room trim 1 includes a first plate section 10, a second plate section 20, a sound absorbing material 30, and a third plate section 40.

The first plate section 10 includes a resin having an elongation rate which is equal to or greater than 120%. The resin of the first plate section 10 includes polypropylene at a percentage by weight which is equal to or greater than 40 and equal to or smaller than 90, polyethylene terephthalate at a percentage by weight which is equal to or greater than 10 and equal to or smaller than 30, and talc at a percentage by weight which is equal to or greater than 0 and equal to or smaller than 10. Note that it is more desirable if the first plate section 10 includes a resin having an elongation rate equal to or greater than 150%. The first plate section 10 is joined with the third plate section 40.

On the rear side of the cargo room trim 1, the first plate section 10 has an outward recess 11. The outward recess 11 is formed by drawing such that the outward recess 11 is recessed from the inner side of the cargo room 102 (see FIG. 1) to the outer side of the cargo room 102. Note that the outward recess 11 may be formed by bulging. In addition, drawing may be deep drawing or shallow drawing.

In addition, on the front side (front-back direction) of the cargo room trim 1, the first plate section 10 has an inward recess 12 that is continuous with the outward recess 11, and is recessed from the outer side of the cargo room 102 to the inner side of the cargo room 102. Being continuous in this case may mean that the inward recess 12 is directly continuous with the outward recess 11 or may mean that the inward recess 12 is indirectly continuous with the outward recess 11 with another portion being interposed therebetween. The first plate section 10 has an insertion-hole section 13 at the inward recess 12. The insertion-hole section 13 has a hole 13*a* formed therethrough. A second supported section 23 mentioned later of the second plate section 20 is inserted into the hole 13*a* of the insertion-hole section 13.

The second plate section 20 includes a resin having an elongation rate which is equal to or greater than 120%. The second plate section 20 is disposed along the first plate section 10. The resin of the second plate section 20 includes polypropylene at a percentage by weight which is equal to or greater than 40 and equal to or smaller than 90, polyethylene terephthalate at a percentage by weight which is equal to or greater than 10 and equal to or smaller than 30, and talc at a percentage by weight which is equal to or greater than 0 and equal to or smaller than 10. Note that it is more desirable if the second plate section 20 includes a resin having an elongation rate equal to or greater than 150%.

The second plate section 20 has a facing section 21, first supported sections 22, the second supported section 23, a contact section 24, and a protruding section 25. The facing section 21 is a portion to be disposed with a gap from the first plate section 10. The facing section 21 faces the sound absorbing material 30 in a state where the space between the facing section 21 and the first plate section 10 is filled with the sound absorbing material 30.

The first supported sections 22 are portions that extend from the facing section 21 to the first plate section 10, and are supported by the first plate section 10 when the leading ends of the first supported sections 22 are welded to the first plate section 10. A plurality of the first supported sections 22 are formed at the top section of the facing section 21. The first supported sections 22 have extending sections 22*a* and 22*b* that extend from the facing section 21 to the first plate section 10, and a welded section 22*c* (leading end) that extends from the leading end of the extending section 22*a*, and is welded (see FIG. 4A).

The second supported section 23 is a portion supported by the first plate section 10 by being inserted into the hole 13*a* of the insertion-hole section 13 of the first plate section 10.

The contact section 24 is a portion that further extends from the extending section 22*b* extending from the facing section 21 to the first plate section 10, and contacts the first plate section 10. The contact section 24 contacts the first plate section 10 without being welded thereto.

The protruding section 25 is a portion that protrudes in a direction away from the first plate section 10 from a contact position at which the contact section 24 contacts the first plate section 10, and can contact a body panel 50 (see FIG. 4A). The protruding section 25 has an extending section 25*a* extending from the first-plate-section-10 side to the facing-section-21 side, and a contactable section 25*b* that can contact the body panel 50.

Figure 4B:
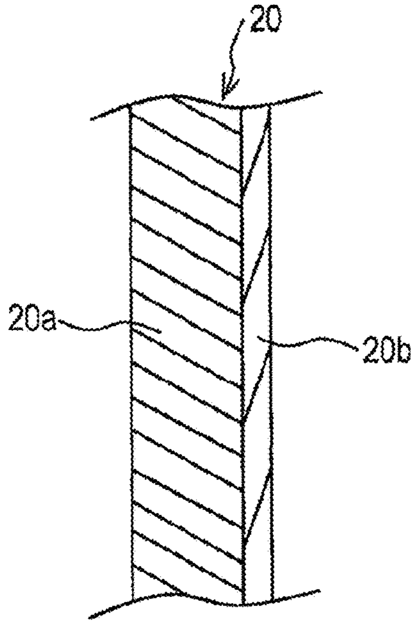
FIG. 4B is a partially enlarged conceptual diagram of a second plate section.

FIG. 4B is a partially enlarged conceptual diagram of the second plate section 20. The second plate section 20 has a base section 20*a* and a covered section 20*b*. The covered section 20*b* is formed of a material softer than the base section 20*a* integrally with the base section 20*a*, faces the body panel 50, and covers the base section 20*a*. The covered section 20*b* is laminated onto the base section 20*a* by extrusion lamination.

The sound absorbing material 30 is disposed between the first plate section 10 and the facing section 21 of the second plate section 20. The sound absorbing material 30 has a first sound absorbing section 31 that covers the outward recess 11, and a second sound absorbing section 32 that covers the inward recess 12 (see FIG. 3). Note that the sound absorbing material 30 is thick before the sound absorbing material 30 is sandwiched between the second plate section 20 and the first plate section 10, and, by being sandwiched between the second plate section 20 and the first plate section 10, the sound absorbing material 30 gets thin.

Next, effects of the cargo room trim 1 of the present embodiment are explained. High-frequency tire pattern noise in noise N (see FIG. 4A) generated from the rear wheel 103 passes through the second plate section 20, and is absorbed by the sound absorbing material 30 while being attenuated between the second plate section 20 and the first plate section 10. Low-frequency road noise in the noise N generated from the rear wheel 103 is reflected and insulated by the second plate section 20. Accordingly, noise that reaches the cargo room 102 is reduced, and it is possible to make the inside of the cargo room 102 quiet.

According to the cargo room trim 1 of the present embodiment explained thus far, the double wall structure including the first plate section 10 and the second plate section 20, and the sound absorbing material 30 between the first plate section 10 and the second plate section 20 absorb the high-frequency tire pattern noise. In addition, since the first plate section 10 is formed of a resin having an elongation rate which is equal to or greater than 120%, the member of the rear portion of the first plate section 10 can be manufactured using the material of the front portion of the first plate section 10 included in the cargo room trim 1 without occurrence of a fracture even if drawing or the like is performed. As a result, it is possible to mold, as a solid plate, the front portion and rear portion of the cargo room trim 1 while ensuring high-frequency-noise sound absorption performance.

Note that, by filling, with the sound absorbing material 30, the space between the first plate section 10 and the second plate section 20 in the double wall structure including the first plate section 10 and the second plate section 20, it is possible to inhibit deterioration of transmission loss due to the coincidence effect and resonance transmission.

In addition, according to the cargo room trim 1 of the present embodiment, weight reduction is realized as compared to conventional techniques, the manufacturing cost is reduced, the moldability of the cargo room trim is enhanced as compared to conventional techniques, and the rigidity is increased as compared to conventional techniques.

That is, even without providing a rubber sheet with a high specific gravity on the outer side of the first plate section 10, the weight reduction mentioned before is realized while ensuring the sound absorption performance by forming the double wall structure including the first plate section 10 and the facing section 21 of the second plate section 20. In addition, cost reduction is realized by not using a rubber sheet.

In addition, since the welded section 22*c* of the first supported section 22 is welded to the first plate section 10, the second plate section 20 can be attached to the first plate section 10 even without an adhesive. In addition, since the second plate section 20 is supported by the first plate section 10 when the second supported section 23 is inserted to the hole 13*a* of the insertion-hole section 13, the second plate section 20 can be attached to the first plate section 10 even without an adhesive. Since the attachment is possible even without an adhesive in this manner, the reduction of the manufacturing cost mentioned before is realized.

In addition, the resins of the first plate section 10 and the second plate section 20 include polypropylene at a percentage by weight which is equal to or greater than 40 and equal to or smaller than 90, polyethylene terephthalate at a percentage by weight which is equal to or greater than 10 and equal to or smaller than 30, and talc at a percentage by weight which is equal to or greater than 0 and equal to or smaller than 10, and accordingly low-frequency-road-noise sound insulation performance is ensured. Since such resins of the first plate section 10 and the second plate section 20 have high elongation rates, the enhancement of the moldability mentioned before is realized.

In addition, the protruding section 25 maintains the gap between the first plate section 10 and the second plate section 20 even if the protruding section 25 of the second plate section 20 contacts the body panel 50, and a load is applied to the protruding section 25. Such a protruding section 25 increases the rigidity of the cargo room trim 1. Moreover, whereas chip urethane is conventionally disposed between a fiber reinforced sheet and a body panel to increase the rigidity, such chip urethane becomes unnecessary, and the reduction of the manufacturing cost mentioned before is realized.

In addition, since the covered section 20*b*, which is made of a soft material, of the second plate section 20 contacts the body panel 50, hitting sounds that are generated when the second plate section 20 hits the body panel 50 are made quieter.

Although the present invention has been explained thus far on the basis of an embodiment, the present invention is not limited to the embodiment described above. Modifications may be made to the present invention within the scope not departing from the aim of the present invention, and the present technology may be combined with other technologies as appropriate as long as such combinations are possible. For example, whereas the second plate section 20 does not cover the outward recess 11 of the first plate section 10 and the first sound absorbing section 31 of the sound absorbing material 30 in the configuration in the embodiment mentioned before, the present technology is not limited to the embodiment described above in this regard. The second plate section 20 may cover the outward recess 11 of the first plate section 10 and the first sound absorbing section 31 of the sound absorbing material 30, in another possible configuration.

In addition, whereas the welded section 22*c* of the first supported section 22 is welded to the first plate section 10 in the configuration in the embodiment mentioned before, the present technology is not limited to the embodiment described above in this regard. An insertion-hole section 13 having a hole 13*a* may be formed through the first plate section 10 at a position corresponding to the welded section 22*c* of the first supported section 22, and the leading end of the first supported section 22 may be inserted to the hole 13*a* of such an insertion-hole section 13, in another possible configuration. If, in this manner, all connections between the first plate section 10 and the second plate section 20 are realized by insertion of leading ends of the second plate section 20 to the holes 13*a* of the insertion-hole sections 13 of the first plate section 10, not only an adhesive is not required, but also welding is not required.

In addition, although a trim manufacturing method of manufacturing the cargo room trim is not explained particularly in the embodiment mentioned before, it is sufficient if, for example, the trim manufacturing method includes: a drawing step of forming, by drawing, the outward recess 11 of the first plate section 10; a sound absorbing material disposing step of disposing the sound absorbing material 30 on a surface of the first plate section 10 on the outer side of the cargo room 102; and a second plate section disposing step of disposing the second plate section 20 on a surface of the sound absorbing material 30 on the outer side of the cargo room 102.

REFERENCE SIGNS LIST

1: Cargo room trim
10: First plate section
11: Outward recess
12: Inward recess
13: Insertion-hole section
13*a*: Hole
20: Second plate section
20*a*: Base section
20*b*: Covered section
21: Facing section
22: First supported section
22*a*: Extending section
22*b*: Extending section
22*c*: Welded section (leading end)
23: Second supported section
24: Contact section
25: Protruding section
25*a*: Extending section
25*b*: Contactable section
30: Sound absorbing material
31: First sound absorbing section
32: Second sound absorbing section
40: Third plate section
50: Body panel
100: Vehicle
101: Rear seat
102: Cargo room
103: Rear wheel
N: Noise

The invention claimed is:

1. A cargo room trim included in a side wall of a cargo room disposed horizontally next to and/or above a rear wheel of a vehicle, the cargo room trim comprising:

a first plate section that includes a resin having an elongation rate which is equal to or greater than 120%, and has: an outward recess recessed from an inner side of the cargo room to an outer side of the cargo room; and an inward recess that is continuous with the outward recess in a front-back direction of the cargo room, and is recessed from the outer side of the cargo room to the inner side of the cargo room;

a second plate section disposed along the first plate section; and a sound absorbing material disposed between the first plate section and the second plate section, wherein the second plate section has: a facing section that faces the sound absorbing material disposed between the second plate section and the first plate section; and a second supported section that extends from the facing section to the first plate section, and is supported by the first plate section, the first plate section has an insertion-hole section having formed therethrough a hole through which the second supported section is inserted, and the second supported section is supported by the first plate section by being inserted to the hole of the insertion-hole section.

2. A cargo room trim included in a side wall of a cargo room disposed horizontally next to and/or above a rear wheel of a vehicle, the cargo room trim comprising:

a first plate section that includes a resin having an elongation rate which is equal to or greater than 120%, and has: an outward recess recessed from an inner side of the cargo room to an outer side of the cargo room; and an inward recess that is continuous with the outward recess in a front-back direction of the cargo room, and is recessed from the outer side of the cargo room to the inner side of the cargo room;

a second plate section disposed along the first plate section; and a sound absorbing material disposed between the first plate section and the second plate section, wherein the second plate section includes a resin having an elongation rate which is equal to or greater than 120%, and the resins of the first plate section and the second plate section include:

polypropylene at a percentage by weight which is equal to or greater than 40and equal to or smaller than 90;

polyethylene terephthalate at a percentage by weight which is equal to or greater than 10 and equal to or smaller than 30; and talc at a percentage by weight which is equal to or greater than 0 and equal to or smaller than 10.

3. A cargo room trim included in a side wall of a cargo room disposed horizontally next to and/or above a rear wheel of a vehicle, the cargo room trim comprising:

a first plate section that includes a resin having an elongation rate which is equal to or greater than 120%, and has: an outward recess recessed from an inner side of the cargo room to an outer side of the cargo room; and an inward recess that is continuous with the outward recess in a front-back direction of the cargo room, and is recessed from the outer side of the cargo room to the inner side of the cargo room;

a second plate section disposed along the first plate section; and a sound absorbing material disposed between the first plate section and the second plate section, wherein the second plate section has a protruding section that protrudes in a direction away from the first plate section from a position at which the second plate section contacts the first plate section, and can contact a body panel.

4. The cargo room trim according to claim 1, wherein the second plate section has:

a base section; and a covered section that is formed of a material softer than the base section integrally with the base section, faces a body panel, and covers the base section.

5. The cargo room trim according to claim 1, wherein the second plate section has: a facing section that faces the sound absorbing material disposed between the second plate section and the first plate section; and a first supported section that extends from the facing section to the first plate section, and is supported by the first plate section, and a leading end of the first supported section is welded to the first plate section.

6. The cargo room trim according to claim 2, wherein the second plate section has: a facing section that faces the sound absorbing material disposed between the second plate section and the first plate section; and a first supported section that extends from the facing section to the first plate section, and is supported by the first plate section, and a leading end of the first supported section is welded to the first plate section.

7. The cargo room trim according to claim 3, wherein the second plate section has: a facing section that faces the sound absorbing material disposed between the second plate section and the first plate section; and a first supported section that extends from the facing section to the first plate section, and is supported by the first plate section, and a leading end of the first supported section is welded to the first plate section.

8. The cargo room trim according to claim 1, wherein the second plate section includes a resin having an elongation rate which is equal to or greater than 120%, and the resins of the first plate section and the second plate section include:

polypropylene at a percentage by weight which is equal to or greater than 40and equal to or smaller than 90;

polyethylene terephthalate at a percentage by weight which is equal to or greater than 10 and equal to or smaller than 30; and talc at a percentage by weight which is equal to or greater than 0 and equal to or smaller than 10.

9. The cargo room trim according to claim 1, wherein the second plate section has a protruding section that protrudes in a direction away from the first plate section from a position at which the second plate section contacts the first plate section, and can contact a body panel.

10. The cargo room trim according to claim 2, wherein the second plate section has a protruding section that protrudes in a direction away from the first plate section from a position at which the second plate section contacts the first plate section, and can contact a body panel.

11. The cargo room trim according to claim 2, wherein the second plate section has:

a base section; and a covered section that is formed of a material softer than the base section integrally with the base section, faces a body panel, and covers the base section.

12. The cargo room trim according to claim 3, wherein the second plate section has:

a base section; and a covered section that is formed of a material softer than the base section integrally with the base section, faces a body panel, and covers the base section.

* * * * *